US005625405A

United States Patent [19]
DuLac et al.

[11] Patent Number: 5,625,405
[45] Date of Patent: Apr. 29, 1997

[54] ARCHITECTURAL ARRANGEMENT FOR A VIDEO SERVER

[75] Inventors: Keith B. DuLac, Derby, Kans.; T. M. Ravi, Sunnyvale, Calif.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 603,694

[22] Filed: Feb. 20, 1996

Related U.S. Application Data

[63] Continuation of Ser. No. 295,199, Aug. 24, 1994, abandoned.

[51] Int. Cl.$^6$ .................................................. H04N 7/173
[52] U.S. Cl. ............................ 348/7; 348/13; 455/4.2; 455/5.1
[58] Field of Search ............................ 348/7, 12, 13; 455/4.2, 5.1, 6.1; H04N 7/173, 7/16

[56] References Cited

U.S. PATENT DOCUMENTS

| | | | |
|---|---|---|---|
| 4,506,387 | 3/1985 | Walter | 455/612 |
| 4,780,757 | 10/1988 | Bryer et al. | 358/86 |
| 5,014,125 | 5/1991 | Pocock et al. | 358/86 |
| 5,130,792 | 7/1992 | Tindell et al. | 348/7 |
| 5,132,992 | 7/1992 | Yurt et al. | 455/5.1 |
| 5,168,353 | 12/1992 | Walker et al. | 358/86 |
| 5,172,413 | 12/1992 | Bradley et al. | 380/20 |
| 5,181,106 | 1/1993 | Sutherland | 358/86 |
| 5,247,347 | 9/1993 | Litteral et al. | 358/85 |
| 5,253,341 | 10/1993 | Rozmanith et al. | 395/200 |
| 5,339,315 | 8/1994 | Maeda et al. | 348/7 |
| 5,341,474 | 8/1994 | Gelman et al. | 348/12 |
| 5,410,343 | 4/1995 | Coddington et al. | 348/12 |
| 5,442,390 | 8/1995 | Hooper et al. | 348/7 |
| 5,446,490 | 8/1995 | Blahut et al. | 348/7 |
| 5,459,506 | 10/1995 | Bushnell | 348/7 |
| 5,477,263 | 12/1995 | O'Callaghan et al. | 348/7 |
| 5,486,864 | 1/1996 | Zdepski | 348/423 |

FOREIGN PATENT DOCUMENTS 9401964  1/1994  WIPO ........................ H04N 1/00

OTHER PUBLICATIONS

RAID–II: A High–Bandwidth Network File Server; Ann L. Drapeau et al.; Apr. 18–21, 1994; pp. 234–244.

Interactive Video on Demand; A.L. Drapeau et al.; May, 1994; pp. 82–88.

"ATM Tehnology for Corporate Networks" by Peter Newman Apr. 1992 p. 91 Lines 1–42.

"Interactive Video on Demand" by Daniel Deloddere et al. May 1994 p. 83.

*Primary Examiner*—John K. Peng
*Assistant Examiner*—Chris Grant
*Attorney, Agent, or Firm*—David F. Zinger; Wayne P. Bailey; James M. Stover

[57] ABSTRACT

A Video-On-Demand (VOD) system including a plurality of video storage devices; an asynchronous transfer mode (ATM) telephony technology network connected to provide video data to a plurality of subscribers; and a unique video server coordinating the conversion and transfer of video data from computer technology devices to the ATM telephony technology network. The video server includes a data converter for converting a first video data stream transmitted via computer technology, fiber channel links, to a second video data stream for transmission via said ATM telephony technology network; a multi-port switch connected to receive said first video data stream from one of a plurality of video data storage devices, such as disk array or tape storage devices, and connected to provide said first video data stream to said data converter; and a controller connected to receive a viewer request signal from a subscriber via said telephony technology network and responsive thereto to generate and provide control signals to said multi-port switch and said data converter for coordinating the transfer video data streams from said video data storage devices to said telephony technology network.

14 Claims, 1 Drawing Sheet

ARCHITECTURAL ARRANGEMENT FOR A VIDEO SERVER

This is a continuation of application Ser. No. 08/295,199 filed Aug. 24, 1994 now abandoned.

The present invention relates to interactive video-on-demand systems for distributing video programming and, more particularly, to a video server for use in such a video-on-demand system.

BACKGROUND OF THE INVENTION

The digital video market is among the earliest markets to develop out of the emerging multimedia business. The applications of digital video will first appear in video-on-demand (VOD) services, which enable viewers to call up particular movies, educational videos, or other video programs whenever they want to watch them. Most present day movie request systems are analog rather than digital having fixed movie start times.

Digital video-on-demand programs may be provided from a centralized location for a large number of users or can be provided "downstream" at Local Exchange companies or Cable Companies. Video-on-demand services are expected to be among the most popular interactive multimedia offerings on the electronic information superhighway.

A network providing movie-on-demand services, upon receipt from a VOD customer of a signal requesting to view a movie, must verify the request and set up necessary connections to a video storage server. Ideally, a video-on-demand (VOD) system will provide functionality similar to that of a video cassette recorder (VCR) or video disk player. The video subscriber or viewer should have control over viewing of video/audio recorded information, including control of start, stop, pause, fast forward, reverse and rewind operations. The video-on-demand service provides the viewer with a large choice of content and allows the viewer to select "hot" new movies, documentaries, old movies, etc. It is a necessary function for a VOD system to store audio/video content and to also permit multiple viewers to access a video program. The system should allow multiple viewers to watch the same video starting at the same time or at different start times. Further, the VOD service must provide a means to select videos, check access rights, bill customers and manage network resources involved in downloading of video content.

The primary component of a VOD system is a video server, a combination of computer hardware and software for delivering stored video information to one or more viewers. A video server should preferably provide storage for hundreds of feature movies, educational video, and other video information for delivery to a viewer upon request.

Present video server implementations utilize technologies and architectures that have limited expandability in terms of number of users supported, performance, and cost of the storage capacity (e.g. high bandwidth). Additionally, most present day video server implementations do not provide multiple users with the ability to start, stop, pause, fast forward or reverse video play. Movies on such a system have dedicated play times not controlled by the viewer.

The present invention brings together, in a concise manner, the technologies of the telephone industry and of the computer industry to allow peak utilization of each of these technologies and avoid deficiencies inherent to each. The invention described herein brings together the necessary components of a VOD system such that a range of services can be implemented incrementally relative to cost and function. The invention described below, through the organization provided by server architecture, uniquely meets the requirements of a video server and the delivery transport to the end user.

OBJECTS OF THE INVENTION

It is therefore an object of the present invention to provide a new and useful video server architecture for video-on-demand applications.

It is another object of the present invention to provide such a video server architecture bringing together both computer technology and telephony technology components to obtain the benefits of each technology.

It is yet another object of the present invention to provide a new and useful video server architecture which is scaleable, allowing capacity to be added to accommodate increased video server requirements.

SUMMARY OF THE INVENTION

There is provided, in accordance with the present invention, a Video-On-Demand (VOD) system comprising a plurality of video storage devices; a telephony technology network connected to provide video data to a plurality of subscribers; and a video server including: a data converter for converting a first video data stream transmitted via computer technology to a second video data stream for transmission via said telephony technology network; a multi-port switch connected to receive said first video data stream from one of a plurality of video data storage devices and connected to provide said first video data stream to said data converter; and a controller connected to receive a viewer request signal from a subscriber via said telephony technology network and responsive thereto to generate and provide control signals to said multi-port switch and said data converter for coordinating the transfer video data streams from said video data storage devices to said telephony technology network.

In the described embodiment, the video storage devices included in the VOD system include a disk array storage devices, tape storage devices, and disk loop storage devices. The computer technology connections between said multi-port switch, said video storage devices, and said data converter comprise fiber channel links, and the telephony technology network comprises an Asynchronous Transfer Mode (ATM) LAN or WAN.

The above and other objects, features, and advantages of the present invention will become apparent from the following description and the attached drawings.

DETAILED DESCRIPTION OF THE PREFERRED EMBODIMENT

Figure 1:
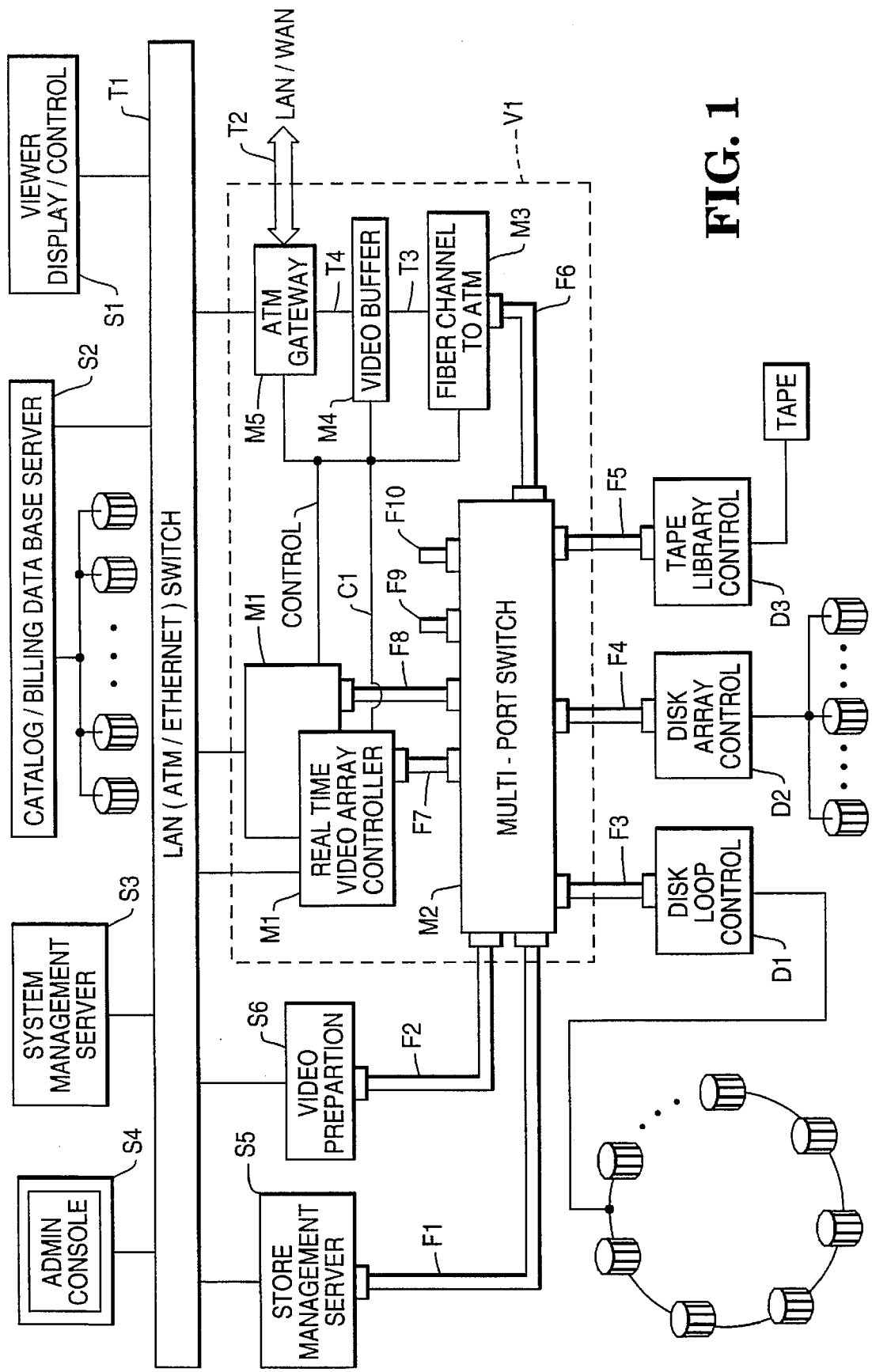
FIG. 1, the sole figure in this application, is an architectural block diagram of a video server for a-on-demand system constructed in accordance with the present invention.

The primary components of the Video-On-Demand (VOD) system shown in the block diagram of FIG. 1, include: a viewer display/control server S1, a catalog/billing data base server S2, a system management server S3, an administration console S4, a storage management server S5, a video preparation server S6, a video server V1, disk storage subsystems D1 and D2, and tape storage system D3. Each one of storage subsystems D1 through D3 is seen to include a control block attached to a corresponding storage device.

Video server V1 interfaces with servers S1 through S6 through a host bus or local area network (LAN) T1. Fiber channel cables F1 through F5 provide data path connections between servers V1, S5 and S6, and video storage subsystems D1, D2 and D3. Video server V1 coordinates the operations of server elements S1 through S6, together with the operation of video storage subsystems D1 through D3, to perform all VOD system functions.

The novelty of the present invention resides in the construction and operation of video server V1, and the manner in which video server V1 is connected with and operates with server elements S1 through S6 and video storage devices D1 through D3. The functions performed by server elements S1 through S6 and video storage subsystems D1 through D3 are apparent from the descriptive titles of the elements and the discussion which follows. Accordingly, details of the internal construction of these elements will not be provided.

Referring again to FIG. 1, video server V1 is seen to include one or more real-time video array controller modules M1 and a multi-port switch module M2. Modules M1 and M2 are implemented in computer technology. Video server V1 further includes an ATM gateway module M5, implemented in telephony technology, a video buffer module M4 and a fiber channel to ATM module M3. Modules M3 and M4 are implemented in a combination of computer and telephony technologies that merge the advantages of modules M1 and M2 to module M3.

Real-time video array controller module M1 includes the hardware/firmware functionality to provide real time control, scheduling and buffering control to the video server. Module M1 is a scaleable function so that as real time requirements increase additional real time video array controller modules can be added. The control of module M1 is provided by server S1 through T1.

The real time video array controller module M1 is connected to video server storage D1, D2 and D3 through multi-port switch M2 and fiber channel cables F3, F4, F5 and F7. Module M1 is responsible for continuous retrieval of video streams from disk loop storage device D1, disk array storage device D2 and tape storage device D3.

The video array controller module M1 can receive VOD commands from a fiber channel link to a LAN or wide area network (WAN) T2, ATM gateway M5 and control lines C1. Video data provided by video storage subsystems D1 through D3 in response to I/O instructions issued by module M1 is delivered from the video storage subsystems via fiber channel links F3 through F5, multi-port switch module M2, fiber channel link F6, and modules M3 through M5 to the local or wide area network T2.

Video array controller module M1 manages the scheduling of I/O operations for video storage subsystems D1 through D3. Module M1 maintains a periodic schedule for each video storage subsystem managed by the controller. A new video stream can be scheduled from any of subsystems D1 through D3 if the scheduling of the new video stream does not perturb the delivery of data for video streams that are already scheduled. In each scheduling cycle enough frames for a stream are read to ensure that a set-top display located with the video requester does not run out of frames to display. The length of the scheduling cycle for a particular storage subsystem is such that the next set of frames for a video stream are retrieved and transmitted before the frames of the previous set have all been displayed. The video array controller module attempts to maximize the number of video streams that can be simultaneously furnished from video storage.

Controller module M1 is also responsible for the real time control of conversion of video data received in fiber channel format to ATM format, the allocation of buffers, the buffering of frames, and the transmission of data to network T2.

The outputs of video array controller module $M_1$ are high performance serial data channels that are based on computer I/O technologies (e.g. Fiber Channel). This connection provides the high bandwidth, long distance data transfer capabilities needed for video data transfer and efficient control for video storage devices D1 through D3. Multi port switch module M2 provides transparent access to devices D1 through D3 for both control and data transfers.

The video server V1 may include multiple video array controllers, each controlling a set of video storage subsystems. When the storage capacity of a video server increases, new video array controller modules may be added to the video server to control the additional storage.

Fiber channel to ATM module M3 permits transmission of video data directly from any one of video storage devices D1 through D3 to the local or wide area network T2. Video buffer module M4 is a set of DRAM buffers used to store video data prior to transmission to the external ATM network. ATM gateway module M5 provides connectivity to the external LAN or WAN network.

In operation, video array controller module M1 sets up video storage subsystems D1 to D3, schedules videos for viewing, and checks if a new video stream can be supported. If additional video streams can not be supported, additional storage devices can be added at multi-port switch module fiber channel ports F9 and F10, and controlled by module M1. Video array controller module M 1 further allocates video buffer space for each video stream in video buffer module M4. Each new stream has a small, dedicated video buffer for smoothing purposes.

Video frames for each stream are periodically read from the storage devices, translated to ATM cell format, and buffered in the video buffer. Video data is removed from the buffers and transmitted over the network when the set-top box residing with the video requester or viewer is ready to consume the next set of frames. In this video server architecture entire movies will not be stored in video buffers.

Video array controller module M1 controls the conversion of computer video data to telephony data within module M3, buffering of video data in module M4 and transmission to the ATM network via ATM Gateway M5 and the fiber channel link to network T2. Video data passes through the appropriate fiber channel link F3 through F5, through switch module M2 and fiber channel link F6 to module M3. The video data is converted by fiber channel to ATM module M3 to a telephony network format, buffered by module M4 and transferred to the network T2 for end user viewing by ATM gateway module.

Scheduling of video streams for a disk array is as follows: Video frames for a first video stream are accessed from video storage and placed in the video buffer. Next frames for a second video stream are accessed and placed in a different set of video buffers. Frames for a number of different streams are similarly accessed one after another from video storage and placed in different sets of video buffers. The frames for the first video stream are thereafter removed from the video buffer and sent over the network T2 to the viewer's set-top for display. To avoid jitter on the viewer's video screen the next set of frames for the first video stream have to be accessed from video storage within a specific time period from the time of last access of frames for this stream. Hence, I/O access to a disk array is according to a cyclical list, with streams ordered by seek time of the current location of the video stream.

Control requests from the viewer are received via T2 and provided to viewer display/control server S1 through T1. Control signals are thereafter provided via LAN switch T1 to the real time video controller M1 to consists of operations to schedule video streams and virtual VCR commands such as Start, Stop, Pause, Fast Forward, and Rewind.

The key characteristics of the invention that distinguish this architecture from present video server architectures are:

1. Utilization of high performance I/O computer technology (e.g. Fiber Channel) as an I/O backplane.

These channels, F1 through F8, within video server V1 provide the ability to support massive bandwidths required for the retrieval of multiple streams of video data. The fiber channel is also critical to the architecture in the implementation of high availability video servers with redundant server storage components. The architecture allows connections to other system components through additional ports F9 and F10 in switch module M2. Additional ports F9 and F10 also allow the connection of storage devices and I/O bandwidth to be scaleable. The fiber channels F1 through F10 are switched rather than shared medium to provide a multiple point-to-point connection for data transfer. Simultaneous transfers can occur, at full bandwidth, on any of the data channels F1 through F10.

2. Direct delivery of data from storage subsystems D1 through D3 to the network T2.

Video data is transferred directly form video storage subsystems to the ATM network by-passing host servers. This avoids a host server bottleneck that restricts the number of simultaneous video streams that can be serviced. Real-time scheduling is provided by module M1. The direct delivery of data from storage subsystems D1 through D3 to the ATM network is enabled by modules M3, M4 and M5 that converts data, for example, from SCSI format on fiber channel link F6 through the frame buffer M4 to the ATM gateway M5.

3. LAN and WAN for delivery of Video Streams.

The architecture can use the ATM (telephony technology) as the underlying network for the local area network T1 as well as the wide area network T2. The Isochronous, e.g., control of video/audio bandwidth, features of the ATM network provide a "just-in-time" delivery of video data over the telephony network. This telephony technology permits multiple dedicated connections to be setup, one per video stream, to allow a large number of users to simultaneously access videos stored in the video server.

4. Storage Hierarchies.

The architecture of the present invention enables a storage hierarchy by allowing high speed transfers of data to and from each control block D1 through D3 to the corresponding attached storage devices It can thus be seen that there has been provided by the present invention a video server architecture for video-on-demand services which employs both computer technology and telephony technology components to obtain the benefits of each technology, while avoiding deficiencies associated with the utilization of a single one of these technologies. Additionally, the architecture is scaleable, allowing capacity to be added to accommodate increased video server requirements.

Although the presently preferred embodiment of the invention has been described, it will be understood that various changes may be made within the scope of the appended claims.

What is claimed is:

1. A video server for providing video data via a telephony technology network to multiple subscribers, the video server comprising:

a data converter for converting a current video data stream transmitted via computer technology to another video data stream for transmission via a telephony technology network;

a multi-port switch connected to receive said current video data stream from one of a plurality of video data storage devices and connected to provide said current video data stream to said data converter;

a controller connected to receive a viewer request signal from a subscriber via said telephony technology network and responsive thereto to generate and provide control signals to said multi-port switch and said data converter for coordinating transfer of video data streams from said video data storage devices to said telephony technology network, said controller controlling said multi-port switch in outputting said video data stream from said multi-port switch, said controller controlling said data converter in converting said current video data stream to said another video data stream having a telephony technology data format different from a data format of said current video data stream and said controller controlling outputting of said another video data stream to the telephony technology network.

2. The video server in accordance with claim 1, further comprising:

a video buffer connected to receive said another video stream from said data converter; and a gateway module connected to receive said another buffered video stream from said video buffer and connected to said telephony technology network to provide said another buffered video stream thereto.

3. The video server in accordance with claim 1, wherein said plurality of video storage devices includes a disk array storage device.

4. The video server in accordance with claim 1, wherein said plurality of video storage devices includes a tape storage device.

5. The video server in accordance with claim 1, wherein said computer technology connections between said multi-port switch, said video storage devices, and said data converter comprise fiber channel links.

6. The video server in accordance with claim 2, wherein said gateway module includes an asynchronous transfer mode (ATM) gateway module and said ATM gateway module both transmits and receives information relative to the telephony technology network.

7. The video server in accordance with claim 1, wherein information in addition to said current video data stream is provided through said multi-port switch including control information provided between said controller and a storage device controller and in which said control information is communicated bi-directionally between one port to which said controller is connected and another port to which said storage device controller is connected.

8. The video server in accordance with claim 1, wherein said controller is electrically connected to switch means, different from said multi-port switch, and in which said switch means receives signals from said telephony technology network and regulates transmission of control signals to said controller.

9. A video-on-demand (VOD) system comprising:

a plurality of video data storage devices;

storage device controller means including at least a first storage device controller in communication with said plurality of video data storage devices for controlling transfer of video data relative to at least one of said plurality of video data storage devices;

a telephony technology network connected to provide video data to a plurality of subscribers; and a video server including:

a data converter for converting a current video data stream transmitted via computer technology to another video data stream for transmission via said telephony technology network;

a multi-port switch including a number of ports, wherein through at least some of said ports information is transferred bi-directionally, said number of ports including a first port, a second port and a third port, with one of said ports of said number of ports connected to receive said current video data stream from said one of said video data storage devices and connected to provide said current video data stream to said data converter;

controller means connected to receive at least one viewer request signal from a subscriber via said telephony technology network and responsive thereto to generate and provide control signals to said multi-port switch and said data converter for coordinating transfer of video data streams from said video data storage devices to said telephony technology network, said controller means including a first controller connected to said first port of said multi-port switch for controlling said multi-port switch and outputting said current video data stream from said multi-port switch by communication with said storage device controller means through said multi-port switch; and switch means, different from said multi-port switch, connected to said controller means for receiving signals from said telephony technology network and for regulating transmission of control signals to said controller means including said first controller and each controller of said controller means and in which a second controller of said controller means, when real time requirements increase to require use of said second controller, is connectable to said switch means and to said second port of said multi-port switch for providing control signals to said second port and said second controller being responsive to another viewer request signal to generate and provide control signals to said second port;

wherein information in addition to said current video data stream is provided through said multi-port switch including control information provided between said first controller and said first storage device controller and in which said control information is communicated bi-directionally between said first port to which said first controller is connected and said third port to which said first storage device controller is connected.

10. The VOD system in accordance with claim 9, wherein said plurality of video storage devices includes a disk array storage device.

11. The VOD system in accordance with claim 9, wherein said plurality of video storage devices includes a tape storage device.

12. The VOD system in accordance with claim 9, wherein each of said first, second and third ports of said multi-port switch communicates with a single fiber channel.

13. The VOD system in accordance with claim 9, wherein said storage controller means includes a second storage device controller, each of said first and second storage device controllers controls different storage devices of said plurality of video data storage devices and with each of said storage devices being a member of only one system of a group of storage systems, with said group including disk array storage, tape storage and disk loop storage.

14. The VOD system in accordance with claim 9, wherein said first controller also controls said data converter in converting said current video data stream to said another video data stream having a telephony technology data format different from a data format of said current video data stream and said first controller additionally controls outputting of said another video data stream to the telephony technology network.

* * * * *